A. Kessberger.

Improved Axle and Wagon Brake.

Reissue No. 3592 Dated Aug. 10, 1869.

Witnesses.

Saml. J. Moore

Jesse Gepp.

Inventor.

A. Kessberger by Poindle & Poindle

Attorneys Attorneys.

United States Patent Office.

AUGUST KESSBERGER, OF SPRINGFIELD, ILLINOIS.

*Letters Patent No.* 88,721, *dated April* 6, 1869; *reissue No.* 3,592, *dated August* 10, 1869.

IMPROVED WAGON-BRAKE.

The Schedule referred to in these Letters Patent and making part of the same.

*To all whom it may concern:*

Be it known that I, AUGUST KESSBERGER, of Springfield, in the county of Sangamon, and State of Illinois, have invented certain new and useful Improvements in Wagon-Axles and Brakes; and do hereby declare that the following is a full, clear, and exact description of the same, reference being had to the accompanying drawing, making a part of this specification, in which—

Letters of like name and kind refer to like parts in each of the figures.

Figure 1:
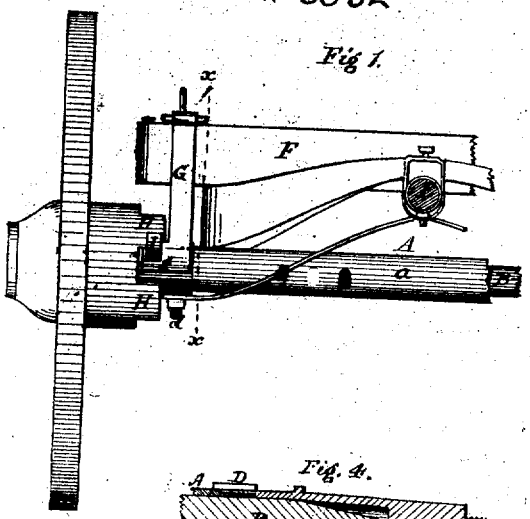
Figure 1 is a broken front elevation of the rear axle, brake, and running-gear.
Figure 2:
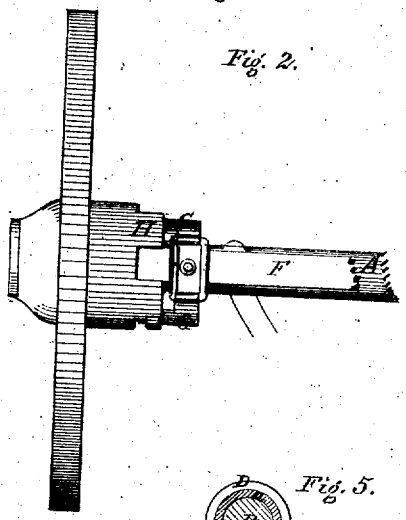
Figure 2 is a top view of the same.
Figure 4:
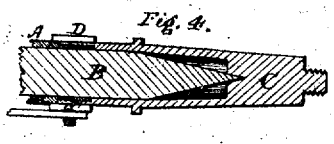
Figure 4 is a central longitudinal section of the thimble-skein and outer end of the axle.
Figure 5:
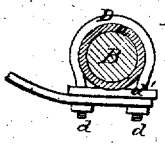
Figure 5 is a cross-section of the same on the line *y y*.
Figure 3:
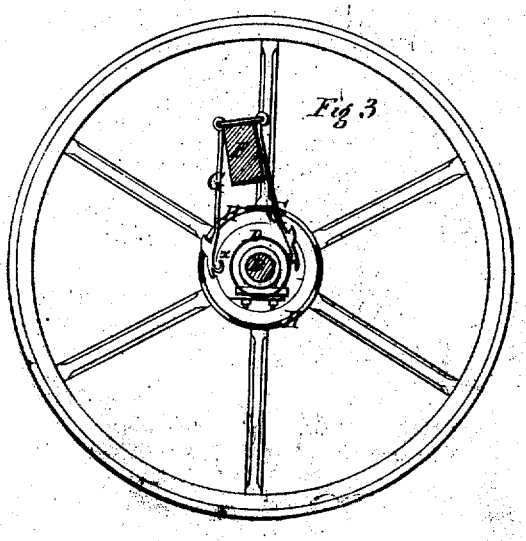
Figure 3 is a cross-section on the line *x x* of fig. 1.

The nature of my invention consists in the employment of hollow metal pipes filled with wood for the construction of axles and coupling-bars, and in combination therewith, a thimble-skein, constructed and secured to said axle in the peculiar manner hereinafter described.

It also consists of the employment of a brake pivoted upon the ends of the bolster, and so constructed and adjusted as to cause it to engage with notches in the band upon the inner end of the hubs, whenever said bolster is thrown to the front or rear of the axle, as is hereinafter fully shown.

In the annexed drawing—

A represents the axle-tree, consisting of a hollow metal pipe, *a*, filled with wood B.

A thimble-skein, C, is secured upon the end of the axle, by means of a female screw-thread, within the inner end of said thimble-skein, which corresponds with a male-screw thread upon the end of said axle, and permits the former to be screwed over the latter.

In order that the joint thus formed may be strengthened, and the thimble-skein prevented from bursting, a clip, D, is passed around the same, and tightened and secured by means of two bolts, *d d*, upon its lower ends, which pass through a clamp, *d'*, and are each provided with a nut. Said thimble-skein is hollow at its inner end, and the cavity, extending outward nearly to the outer end thereof, is filled with the end of the wooden centre of the axle-tree B.

The coupling-bar E is also constructed of metal pipe filled with wood.

Hinged to opposite sides of the bolster F, near each end, are two flat pieces of metal, G G, forming the brake, which extend downward to the centre of the axle, and have upon their lower ends an L-shaped piece, *g*, which projects inside of the band H, upon the inner side of the hub.

The lower end of each brake is curved inward, so as to conform to the shape of the band, and each projection *g* is provided with a hook-shaped tooth, I, extending outward and upward, so as to engage with notches within the circumference of said band, when said brake is swung outward, and arrest the motion of the wheel.

From the foregoing description it will be readily seen, that if the bolster be tipped forward or to the rear, (as in ascending or descending a hill,) the brakes upon the lower side will automatically engage with the wheel and arrest its motion.

This arrangement is very convenient when the wagon is ascending a hill, as, when necessary to stop, the rear brakes at once engage with the wheels, and prevent said wagon from moving backward, entirely relieving the horses from strain. When the team is started, the brakes are instantly released, without attention from the driver.

In order that the brakes may not be caused to engage with the wheel by the jolting of the wagon, they are held against the axle by means of a cord secured to an eye, *x'*, upon the inner side of each brake, near its lower end, which cord passes around said axle, and from thence forward, within convenient reach of the driver.

The advantages possessed by this brake are, that it is automatic in its operation, requiring no care or attention other than to secure it against the axle when not in use.

Having thus fully set forth the nature and merits of my invention,

What I claim as new, and desire to secure by Letters Patent, is—

1. The automatic brake G, provided with the projection *g* and curved tooth H, and pivoted or hinged to or upon the bolster F, substantially as herein shown and described.

2. The notched band H upon the inner end of the hub, in combination with the brake G, substantially as and for the purpose specified.

3. The within-described wagon running-gear, consisting of the axle A, thimble-skein C, clip D, coupling-bar E, bolster F, brakes G G, (provided with the projections *g g* and curved teeth H H,) and the slotted band I, upon the inner end of the hub, all constructed and arranged substantially as and for the purpose shown.

In testimony that I claim the foregoing, I have hereunto set my hand, this 29th day of May, 1869.

A. KESSBERGER.

Witnesses:

GEO. O. MARCY,
J. A. HUGHES.